United States Patent
Cho et al.

(10) Patent No.: US 10,663,578 B2
(45) Date of Patent: May 26, 2020

(54) APPARATUS AND METHOD FOR DETECTING TARGET

(71) Applicant: AGENCY FOR DEFENSE DEVELOPMENT, Daejeon (KR)

(72) Inventors: Byung-Lae Cho, Sejong-si (KR); Jung-Soo Lee, Sejong-si (KR); Sun-Gu Sun, Seoul (KR); Jong-Min Lee, Daejeon (KR); Jong-Pill Kim, Seongnam-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 310 days.

(21) Appl. No.: 15/787,529

(22) Filed: Oct. 18, 2017

(65) Prior Publication Data

US 2019/0049573 A1 Feb. 14, 2019

(30) Foreign Application Priority Data

Aug. 10, 2017 (KR) .................. 10-2017-0101707

(51) Int. Cl.
*G01S 13/86* (2006.01)
*G01S 17/34* (2020.01)
(Continued)

(52) U.S. Cl.
CPC .......... *G01S 13/865* (2013.01); *G01S 13/34* (2013.01); *G01S 13/341* (2013.01);
(Continued)

(58) Field of Classification Search
CPC ........ B60R 21/013; G01S 17/34; G01S 17/86
See application file for complete search history.

(56) References Cited

U.S. PATENT DOCUMENTS 5,471,214 A * 11/1995 Faibish ................. G01S 13/931
342/54
6,061,015 A * 5/2000 Sugimoto ............. G01S 13/931
342/27
(Continued)

FOREIGN PATENT DOCUMENTS

JP 02-067985 A 3/1990
JP 2000-009832 A 1/2000
(Continued)

OTHER PUBLICATIONS

Linda J. Mullen et al. "Hybrid lidar-radar: seeing through the scatter". IEEE Microwave magazine. 2000., pp. 42-48.

*Primary Examiner* — Bernarr E Gregory
(74) *Attorney, Agent, or Firm* — Novick, Kim & Lee, PLLC; Sang Ho Lee (57) ABSTRACT

Provided is a target detecting apparatus including: a frequency modulation continuous wave (FMCW) radar that obtains a first beat signal; a linear frequency intensity modulation (LFIM) light detection and ranging (LiDAR) that transmits a second transmission signal obtained by modulating intensity of a continuous wave laser based on an FMCW signal and obtains a second beat signal based on a microwave signal into which a second reception signal reflected from a target is converted and the FMCW signal; and a controller that receives the first beat signal and the second beat signal and obtains information regarding the target based on the first beat signal and the second beat signal.

11 Claims, 6 Drawing Sheets

(51) Int. Cl.
*G01S 13/931* (2020.01)
*G01S 13/58* (2006.01)
*G01S 13/34* (2006.01)
*G01S 17/86* (2020.01)
*G01S 13/00* (2006.01)
*G01S 17/00* (2020.01)

(52) U.S. Cl.
CPC .......... *G01S 13/584* (2013.01); *G01S 13/931* (2013.01); *G01S 17/34* (2020.01); *G01S 17/86* (2020.01)

(56) References Cited

U.S. PATENT DOCUMENTS

| | | | | |
|---|---|---|---|---|
| 6,405,132 | B1* | 6/2002 | Breed | B60R 21/013 |
| | | | | 701/301 |
| 6,721,659 | B2* | 4/2004 | Stopczynski | B60R 21/013 |
| | | | | 180/274 |
| 9,041,589 | B2* | 5/2015 | Chang | G01S 13/931 |
| | | | | 342/165 |
| 9,097,800 | B1* | 8/2015 | Zhu | G01S 13/865 |
| 9,921,307 | B2* | 3/2018 | Schmalenberg | G01S 13/865 |

FOREIGN PATENT DOCUMENTS

| | | |
|---|---|---|
| KR | 10-2015-0118653 A | 10/2015 |
| KR | 10-2015-0134577 A | 12/2015 |
| KR | 10-2017-0062024 A | 6/2017 |
| KR | 10-1744692 B1 | 6/2017 |

\* cited by examiner

APPARATUS AND METHOD FOR DETECTING TARGET

CROSS-REFERENCE TO RELATED APPLICATION

This application claims the benefit of Korean Patent Application No. 10-2017-0101707, filed on Aug. 10, 2017, in the Korean Intellectual Property Office, the disclosure of which is incorporated herein in its entirety by reference.

BACKGROUND

1. Field

The present disclosure relates to an apparatus and method for detecting a target.

2. Description of the Related Art

With the development of technology related to unmanned vehicles, fixed-wing unmanned vehicles, rotary-wing unmanned vehicles, or the like are usefully utilized in civilian and military fields. However, cases of misuse of unmanned vehicles, for example, privacy violation, bioterrorism/bomb terrorism, surveillance patrol over a military region, etc., have also increasingly occurred.

In the related art for detecting an unmanned vehicle, there are an acoustic sensor that detects sound waves generated from a target, a radar sensor that emits electromagnetic waves and receives reflection signals of the electromagnetic waves reflected from a surface of a target, a light detection and ranging (LiDAR) sensor that detects a target by using laser beams, and the like. However, such related art is difficult to effectively use.

For example, it is difficult for the radar sensor to detect an unmanned vehicle in the distance because reflection signals of the unmanned vehicle in response to radio waves decrease as a distance between the radar sensor and the unmanned vehicle increases. In addition, when an unmanned vehicle suddenly changes its flying path or hovers, a reflection characteristic of the unmanned vehicle suddenly changes, and thus, the unmanned vehicle may not be detected by the radar sensor. For the LiDAR sensor, detecting capability may be greatly influenced by weather. Accordingly, apparatuses capable of effectively detecting an unmanned vehicle being illegally used are required and may be developed by making up for shortcomings of the related art.

SUMMARY

One or more embodiments include an apparatus and method for detecting a target.

Additional aspects will be set forth in part in the description which follows and, in part, will be apparent from the description, or may be learned by practice of the presented embodiments.

According to one or more embodiments, a target detecting apparatus includes: a microwave signal generator; a frequency modulation continuous wave (FMCW) radar configured to obtain a first transmission signal by amplifying an FMCW signal generated by the microwave signal generator in a radio frequency (RF) band, transmit the first transmission signal toward the target, receive a first reception signal reflected from the target, and obtain a first beat signal based on the first transmission signal and the first reception signal; a linear frequency intensity modulation (LFIM) light detection and ranging (LiDAR) configured to obtain a second transmission signal by modulating intensity of a continuous wave laser based on the generated FMCW signal, transmit the second transmission signal toward the target, receive a second reception signal reflected from the target, convert the second reception signal into a microwave signal, and obtain a second beat signal based on the FMCW signal and the microwave signal; and a controller configured to receive the first beat signal and the second beat signal and obtain information regarding the target based on the first beat signal and the second beat signal.

In some embodiments, the microwave signal generator may include a local oscillator configured to convert the FMCW signal generated by the microwave signal generator into FMCW signals corresponding to a plurality of frequency bands.

Also, the FMCW radar may be further configured to select one or more FMCW signals from among the FMCW signals corresponding to the plurality of frequency bands, and obtain the first transmission signal by amplifying the selected one or more FMCW signals in the RF band.

The LFIM LiDAR may also be further configured to select one of the FMCW signals corresponding to the plurality of frequency bands, and obtain the second transmission signal by modulating the intensity of the continuous wave laser based on the selected FMCW signal.

The LFIM LiDAR may include an intensity modulator configured to modulate the intensity of the continuous wave laser as the generated FMCW signal is input.

In some embodiments, the LFIM LiDAR may be further configured to supply a direct-current (DC) offset based on an amplitude of the generated FMCW signal to the intensity modulator.

The information regarding the target may include at least one of distance information of the target and speed information of the target.

The controller may be further configured to obtain the information regarding the target by using a reflection characteristic of the target resulting from a difference in center frequency between the first transmission signal and the second transmission signal.

The controller may be further configured to obtain first information of the target based on the first beat signal, obtain second information of the target based on the second beat signal, and obtain the information regarding the target by applying a weighting to the first information and the second information, wherein the weighting is determined based on a signal-to-noise ratio (SNR) of the first beat signal and an SNR of the second beat signal.

According to one or more embodiments, a method by which a target detecting apparatus including an FMCW radar, an LFIM LiDAR, and a controller detects a target includes: obtaining a first transmission signal by amplifying an FMCW signal generated by a microwave signal generator in a radio frequency (RF) band, transmitting the first transmission signal toward the target, receiving a first reception signal reflected from the target, and obtaining a first beat signal based on the first transmission signal and the first reception signal, wherein the obtaining, the transmitting, and the receiving are performed by using the FMCW radar; obtaining a second transmission signal by modulating intensity of a continuous wave laser based on the generated FMCW signal, transmitting the second transmission signal toward the target, receiving a second reception signal reflected from the target, converting the second reception signal into a microwave signal, and obtaining a second beat signal based on the FMCW signal and the microwave signal, wherein the obtaining, the transmitting, the receiving, and the converting are performed by using the LFIM LiDAR; and receiving the first beat signal and the second beat signal and obtaining information regarding the target based on the first beat signal and the second beat signal, wherein the receiving and the obtaining are performed by using the controller.

According to one or more embodiments, a non-transitory computer-readable recording medium includes a recording medium having recorded thereon one or more programs including commands for executing the above method.

The present disclosure may provide an apparatus and method for detecting a target. In detail, the present disclosure may provide an FMCW radar that obtains information regarding a target by using a first transmission signal obtained by amplifying an FMCW signal generated by a microwave signal generator in a RF band, an LFIM LiDAR that obtains information regarding the target by using a second transmission signal obtained by modulating continuous wave laser based on the generated FMCW signal, and a target detecting apparatus that allows pieces of target information obtained from the FMCW radar and the LFIM LiDAR to converge, thereby effectively detecting targets having various reflection characteristics.

Also, the target detecting apparatus according to the present disclosure may detect a target by using signals in various frequency bands, the signals having various waveforms, and thus may effectively detect targets having various reflection characteristics.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Exemplary embodiments will now be described in detail with reference to the accompanying drawings. The descriptions below are merely provided to make the exemplary embodiments concrete and are not intended to limit scope of the appended claims. What one of ordinary skill in the art would have been able to infer from the detailed descriptions and the exemplary embodiments are construed as being included in the claims.

The terms 'be configured' or 'include' used herein should not be construed as including all of various components or steps described herein, and may not include some of the various components or steps or may further include additional components or steps.

While such terms as 'first' and 'second' may be used to describe various components, such components must not be limited to the above terms. The above terms are used only to distinguish one component from another. Also, the term such as " . . . unit", "module", or the like used herein refers to a unit that processes at least one function or operation, and the unit may be implemented by hardware or software, or by a combination of hardware and software.

The terms used herein are selected from among common terms that are currently widely used in consideration of their functions in the present invention. However, the terms may be different according to an intention of one of ordinary skill in the art, a precedent, or the advent of new technology. Also, in particular cases, the terms are discretionally selected by the applicant, and the meaning of those terms will be described in detail in the corresponding part of the detailed description. Therefore, the terms used herein are not merely designations of the terms, but are defined based on the meaning of the terms and the content throughout the present invention.

The present embodiments relate to an apparatus and method for detecting a target, and a detailed description of what is widely known to one of ordinary skill in the art will be omitted.

Figure 1:
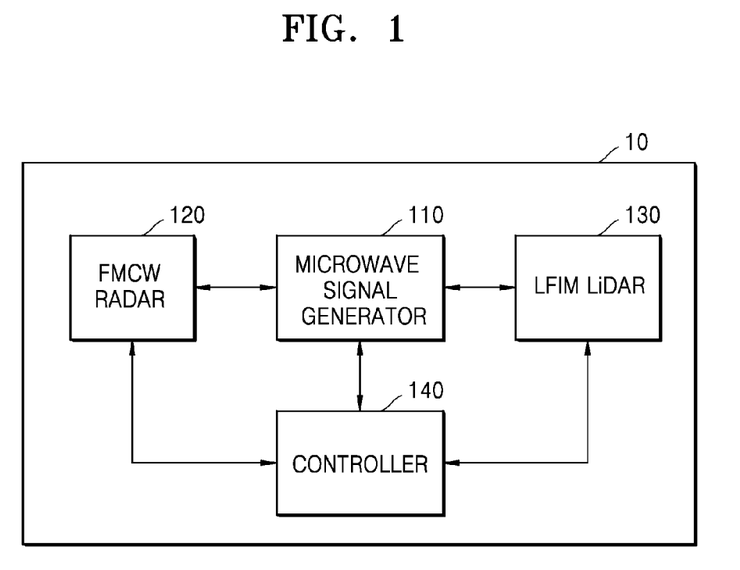
FIG. 1 is a block diagram of a structure of a target detecting apparatus according to some embodiments.

FIG. 1 is a block diagram of a structure of a target detecting apparatus 10 according to some embodiments.

Referring to FIG. 1, the target detecting apparatus 10 may include a microwave signal generator 110, a frequency modulation continuous wave (FMCW) radar 120, a linear frequency intensity modulation (LFIM) light detection and ranging (LiDAR) 130, and a controller 140. Only components of the target detecting apparatus 10 related to the present embodiment are shown in FIG. 1. Accordingly, it will be understood by one of ordinary skill in the art that the target detecting apparatus 10 may further include other general-purpose components in addition to the components shown in FIG. 1.

For example, the target detecting apparatus 10 may further include a memory (not shown). The memory, which is hardware that stores various items of data which are processed in the target detecting apparatus 10, may, for example, store items of data processed in the target detecting apparatus 10 and items of data to be processed in the target detecting apparatus 10. Also, the memory may store applications, drivers, etc. to be driven by the target detecting apparatus 10.

The memory may include random access memory (RAM) such as dynamic random access memory (DRAM) or static random access memory (SRAM), read-only memory (ROM), electrically erasable programmable read-only memory (EEPROM), compact disc read-only memory (CD-ROM), Blu-ray or another optical disc storage, hard disk drive (HDD), solid state drive (SSD), or flash memory, and further, may include another storage device outside which is accessible by the target detecting apparatus 10.

The microwave signal generator 110 may refer to an apparatus or circuit that generates a waveform or signal having a desired cycle and form. For example, the microwave signal generator 110 may include a waveform generator (not shown) that generates a waveform having a desired cycle and form.

Also, the microwave signal generator 110 may generate an FMCW signal. The microwave signal generator 110 may generate an FMCW signal having any type of waveforms by adjusting a chirp bandwidth or chirp duration of the FMCW signal. For example, the microwave signal generator 110 may generate an FMCW signal ascending according to a lapse of time or descending according to a lapse of time, or may generate a signal having a constant frequency.

The microwave signal generator 110 may further include a local oscillator (not shown). The local oscillator may convert an FMCW signal generated by the microwave signal generator 110 into FMCW signals corresponding to a plurality of frequency bands. The microwave signal generator 110 may generate FMCW signals having various types of waveforms and corresponding to various frequency bands by using the waveform generator and the local oscillator.

The FMCW radar 120 may be a radar apparatus that detects a target by emitting a radio wave having an FMCW waveform and receiving a reflection signal reflected from the target. The FMCW radar 120 may obtain a first transmission signal by amplifying an FMCW signal generated by the microwave signal generator 110 in a radio frequency (RF) band. The RF band may refer to a frequency band of several MHz to several tens of GHz, but the present disclosure is not limited thereto.

The FMCW radar 120 may select one or more FMCW signals from among FMCW signals corresponding to a plurality of frequency bands, and may obtain a first transmission signal by amplifying the selected one or more FMCW signals in the RF band.

Also, the FMCW radar 120 may transmit a first transmission signal toward a target, and may receive a first reception signal reflected from the target. The FMCW radar 120 may include one or more transmitting and receiving antennas (not shown) for transmitting a first transmission signal toward a target and receiving a first reception signal reflected from the target. For example, when the FMCW radar 120 includes a plurality of transmitting and receiving antennas, the plurality of transmitting and receiving antennas may be spaced at regular intervals.

The FMCW radar 120 may obtain a first beat signal based on the first transmission signal and the first reception signal. For example, the FMCW radar 120 may obtain a first beat signal including distance information of a target or speed information of the target by mixing the first transmission signal and the first reception signal with each other.

The LFIM LiDAR 130 may be a LiDAR that detects a target by using a laser beam. The LFIM LiDAR 130 may obtain a second transmission signal by modulating intensity of a continuous wave laser based on an FMCW signal generated by the microwave signal generator 110. The continuous wave laser may have a frequency of several hundreds of THz, but the present disclosure is not limited thereto.

The LFIM LiDAR 130 may select one of FMCW signals corresponding to a plurality of frequency bands, and may obtain a second transmission signal by modulating intensity of a continuous wave laser based on the selected FMCW signal.

The LFIM LiDAR 130 may include an intensity modulator (not shown) that modulates continuous wave laser as an FMCW signal is input. The intensity modulator may be an optical intensity modulator. The LFIM LiDAR 130 may modulate intensity of a continuous wave laser by using the optical intensity modulator and then may amplify a modulated laser signal by using an optical amplifier. Also, the LFIM LiDAR 130 may modulate intensity of a continuous wave laser amplified by the optical amplifier by using the optical intensity modulator. The LFIM LiDAR 130 may supply a direct-current (DC) offset based on the amplitude of an FMCW signal to the intensity modulator.

The LFIM LiDAR 130 may transmit a second transmission signal toward a target. For example, the LFIM LiDAR 130 may include a collimator (not shown) for transmitting a second transmission signal toward a target. Also, the LFIM LiDAR 130 may receive a second reception signal reflected from the target.

The LFIM LiDAR 130 may convert the second reception signal into a microwave signal. For example, the LFIM LiDAR 130 may include a photo detector for receiving a second reception signal reflected from a target, and may remove a DC offset and a laser signal from the signal received by the photo detector. As the DC offset and the laser signal are removed, the second reception signal may be converted into a microwave signal.

The LFIM LiDAR 130 may obtain a second beat signal based on the FMCW signal and the microwave signal. The LFIM LiDAR 130 may obtain a second beat signal including distance information of a target or speed information of the target by mixing the FMCW signal used to modulate continuous wave laser and the microwave signal resulting from conversion with each other.

The controller 140 may control all the operations that allow the target detecting apparatus 10 to detect a target. For example, the controller 140 may control the microwave signal generator 110, the FMCW radar 120, and the LFIM LiDAR 130 to perform operations.

The controller 140 may be implemented by one processor or a plurality of processors. For example, the controller 140 may be implemented with an array of multiple logic gates, or may be implemented with a combination of a general-purpose microprocessor and a memory in which a program executable in a microprocessor is stored. For example, the controller 140 may include an electric circuit such as a signal processor or a digital signal processor (DSP).

The controller 140 may receive a first beat signal and a second beat signal, and may obtain information regarding a target based on the first beat signal and the second beat signal. For example, the controller 140 may receive a first beat signal from the FMCW radar 120, and may receive a second beat signal from the LFIM LiDAR 130. The information regarding the target may include at least one of distance information of the target and speed information of the target.

The controller 140 may obtain distance information of the target or speed information of the target from respective frequencies of the first beat signal and the second beat signal. A frequency of the first beat signal may correspond to a difference between a frequency of the first transmission signal and a frequency of the first reception signal, and a frequency of the second beat signal may correspond to a difference between a frequency of the FMCW signal and a frequency of the microwave signal.

Also, the controller 140 may obtain information regarding the target by using a reflection characteristic of the target resulting from a difference in center frequency between the first transmission signal and the second transmission signal. Since the first transmission signal is a radio wave, and the second transmission signal is laser, center frequencies of the first transmission signal and the second transmission signal may be different from each other. Since a reflection characteristic of the target changes according to frequency, the controller 140 may obtain information regarding the target by using a reflection characteristic of the target resulting from a frequency band difference between the first transmission signal and the second transmission signal.

The controller 140 may obtain first information of the target based on the first beat signal and obtain second information of the target based on the second beat signal, and may obtain information regarding the target by applying a weighting determined based on a signal-to-noise ratio (SNR) of the first beat signal and an SNR of the second beat signal to the first information and the second information.

Respective detecting capabilities of the FMCW radar 120 and the LFIM LiDAR 130 may be different from each other due to a reflection characteristic of the target or an influence of environment, and accordingly, the controller 140 may obtain information regarding the target with high accuracy by setting a high weighting on information obtained by an apparatus from among the FMCW radar 120 and the LFIM LiDAR 130 having a better detecting capability in each situation.

The target detecting apparatus 10 according to the present disclosure may effectively detect targets having various reflection characteristics and a small moving target by using the FMCW radar 120 and the LFIM LiDAR 130 according to situations.

Figure 2:
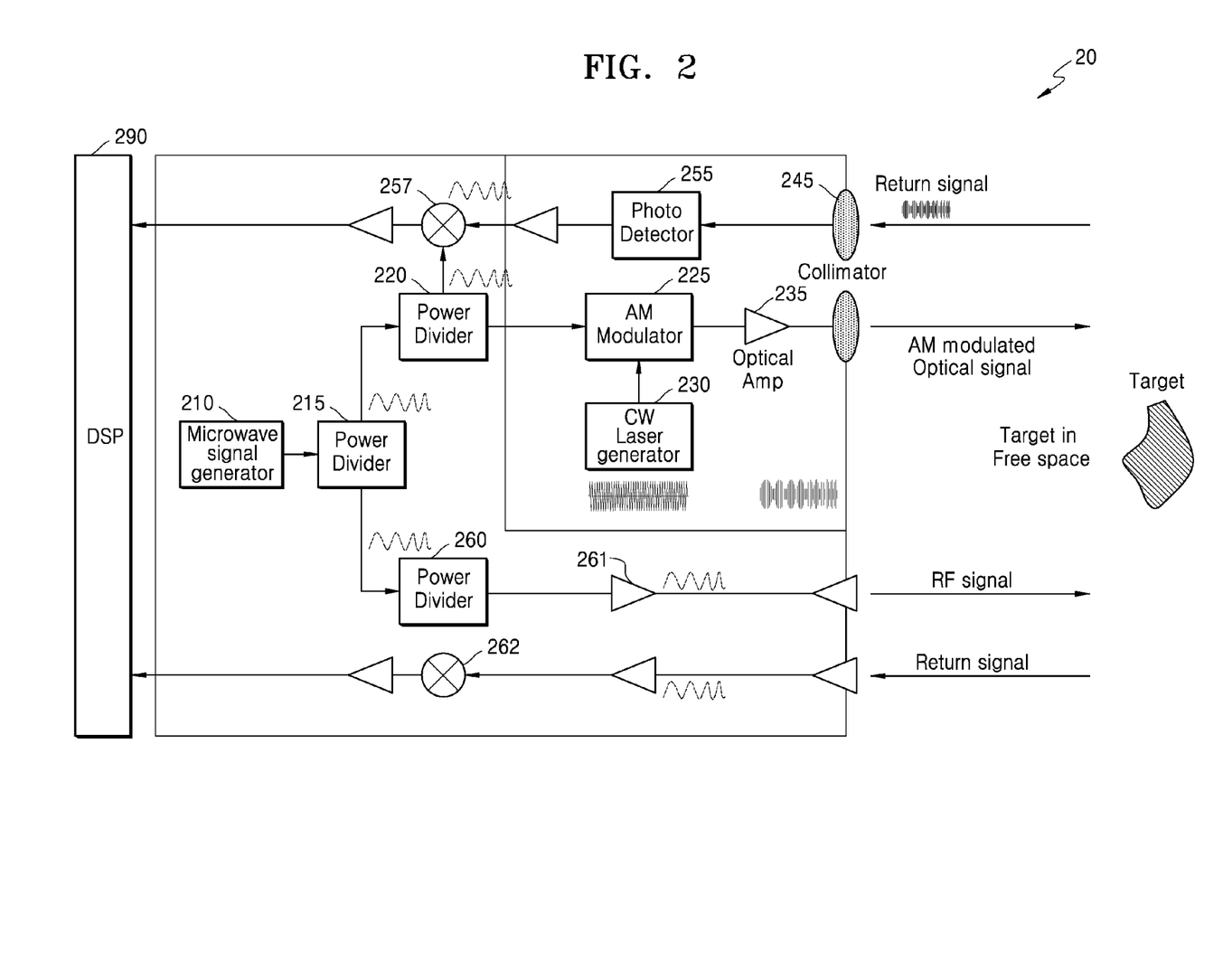
FIG. 2 shows an example of a target detecting apparatus according to some embodiments.

FIG. 2 shows an example of a target detecting apparatus 20 according to some embodiments.

Referring to FIG. 2, the target detecting apparatus 20 may include a microwave signal generator 210, power dividers 215, 220, and 260, an intensity modulator (or AM modulator) 225, a continuous wave laser generator 230, an optical amplifier 235, a collimator 245, a photo detector 255, an amplifier 261, mixers 257 and 262, and a DSP 290.

The microwave signal generator 210 may generate an FMCW signal. The power divider 215, which is an apparatus that divides received power to two or more antennas or antenna elements at a certain ratio, may divide the generated FMCW signal to components that perform operations of an FMCW radar or components that perform operations of an LFIM LiDAR. For example, the power divider 215 may divide the generated FMCW signal to the power divider 220 and the power divider 260.

The power divider 260, which is one of the components that perform operations of the FMCW radar, may transmit an FMCW signal to the amplifier 261 so that a first transmission signal of the FMCW radar may be generated. Also, when a first reception signal reflected from a target is received, the power divider 260 may transmit the FMCW signal to the mixer 262 in order to obtain a first beat signal. The FMCW signal (that is, the first transmission signal) and the first reception signal may be mixed with each other in the mixer 262, and thus, a first beat signal may be obtained.

The power divider 220, which is one of the components that perform operations of the LFIM LiDAR, may provide an input for modulating intensity of a continuous wave laser generated by the continuous wave laser generator 230 by transmitting an FMCW signal to the intensity generator 225. Also, when a second reception signal is received, the power divider 220 may transmit the FMCW signal to the mixer 257 in order to obtain a second beat signal.

The optical amplifier 235 may generate a second transmission signal by amplifying a laser signal modulated by the intensity modulator 225. The collimator 245 may emit the second transmission signal toward the target. Also, the collimator 245 may receive a second reception signal reflected from the target.

The photo detector 255 may convert a received laser signal into an electrical signal. For example, as a DC offset and a laser signal are removed from a signal received by the photo detector 255, the received signal may be converted into a microwave signal. The FMCW signal (that is, the signal used to modulate continuous wave laser) and the microwave signal may be mixed with each other in the mixer 257, and thus, a second beat signal may be obtained.

The DSP 290 may receive a first beat signal and a second beat signal, and may obtain information regarding the target by analyzing the first beat signal and the second beat signal. For example, the DSP 290 may obtain distance information of the target or speed information of the target from respective frequencies of the first beat signal and the second beat signal.

Also, the DSP 290 may obtain information regarding the target by using a reflection characteristic of the target resulting from a difference in center frequency between the first transmission signal and the second transmission signal. The DSP 290 may obtain first information of the target based on the first beat signal and obtain second information of the target based on the second beat signal, and may obtain information regarding the target by applying a weighting determined based on an SNR of the first beat signal and an SNR of the second beat signal to the first information and the second information.

Figure 3:
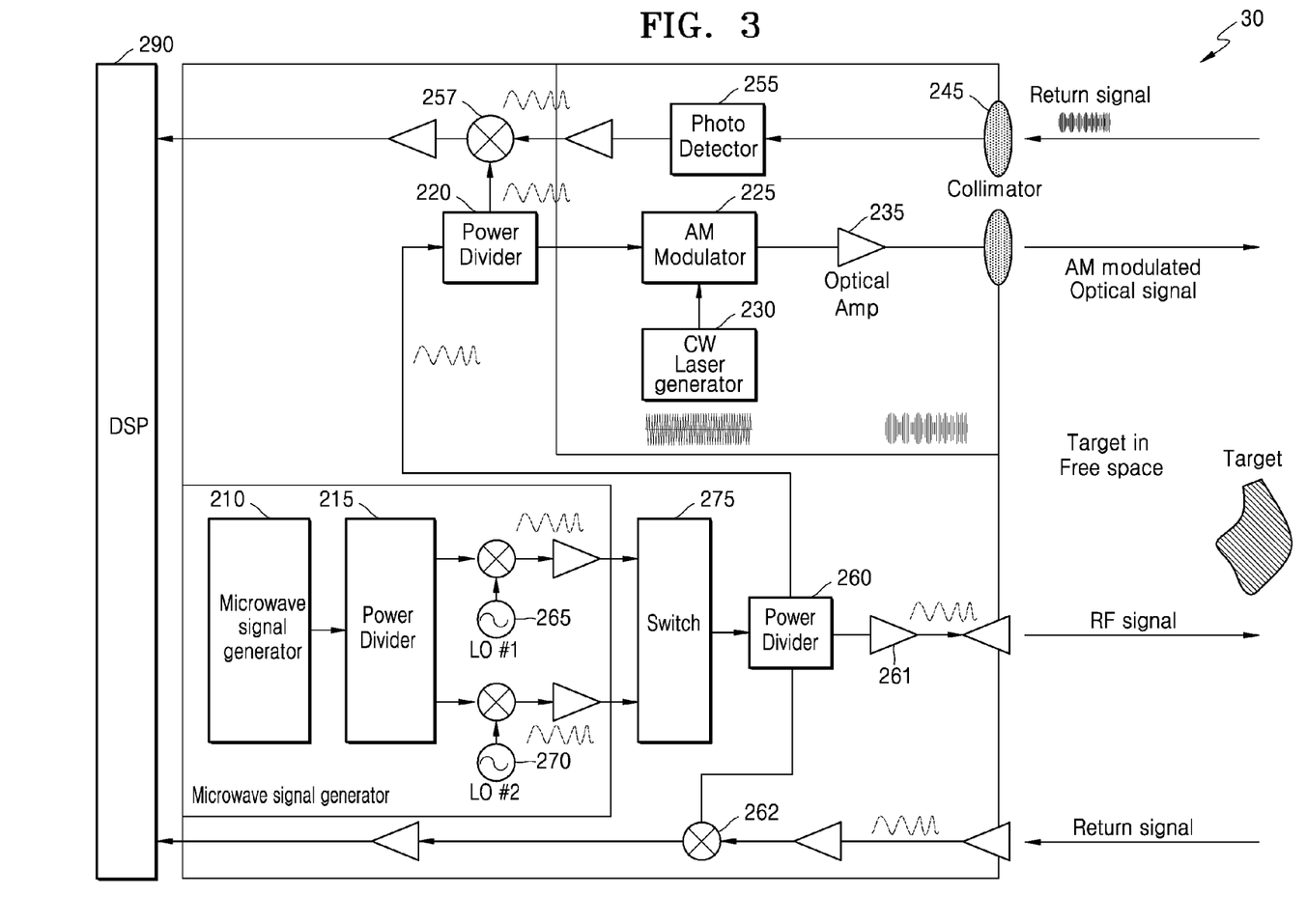
FIG. 3 shows another example of a target detecting apparatus according to some embodiments.

FIG. 3 shows another example of a target detecting apparatus 30 according to some embodiments.

Referring to FIG. 3, the target detecting apparatus 30 may further include local oscillators 265 and 270 and a switch 275 in addition to the microwave signal generator 210, the power dividers 215, 220, and 260, the intensity modulator 225, the continuous wave laser generator 230, the optical amplifier 235, the collimator 245, the photo detector 255, the amplifier 261, the mixers 257 and 262, and the DSP 290.

The microwave signal generator 210, the power dividers 215, 220, and 260, the intensity modulator 225, the continuous wave laser generator 230, the optical amplifier 235, the collimator 245, the photo detector 255, the amplifier 261, the mixers 257 and 262, and the DSP 290 of FIG. 3 may perform the same operations as the components of FIG. 2. Accordingly, a detailed description of the corresponding components is omitted below.

The microwave signal generator 210 may further include the local oscillators 265 and 270. The local oscillators 265 and 270 may convert an FMCW signal generated by the microwave signal generator 210 into FMCW signals corresponding to a plurality of frequency bands. For example, the local oscillator 265 may convert the FMCW signal into an FMCW signal corresponding to a first frequency band, and the local oscillator 270 may convert the FMCW signal into an FMCW signal corresponding to a second frequency band.

The switch 275 may select one of the FMCW signal corresponding to the first frequency band and the FMCW signal corresponding to the second frequency band. A frequency band of an FMCW signal which is input to modulate continuous waves in an LFIM LiDAR and an FMCW signal corresponding to a transmission signal of an FMCW radar may be changed by selection of the switch 275.

Since a reflection characteristic of a target may change according to a frequency band, the target detecting apparatus 30 may change a frequency band of an FMCW signal input to modulate continuous waves in an LFIM LiDAR and an FMCW signal corresponding to a transmission signal of an FMCW radar into a frequency band where a probability of detecting a target increases.

Figure 4:
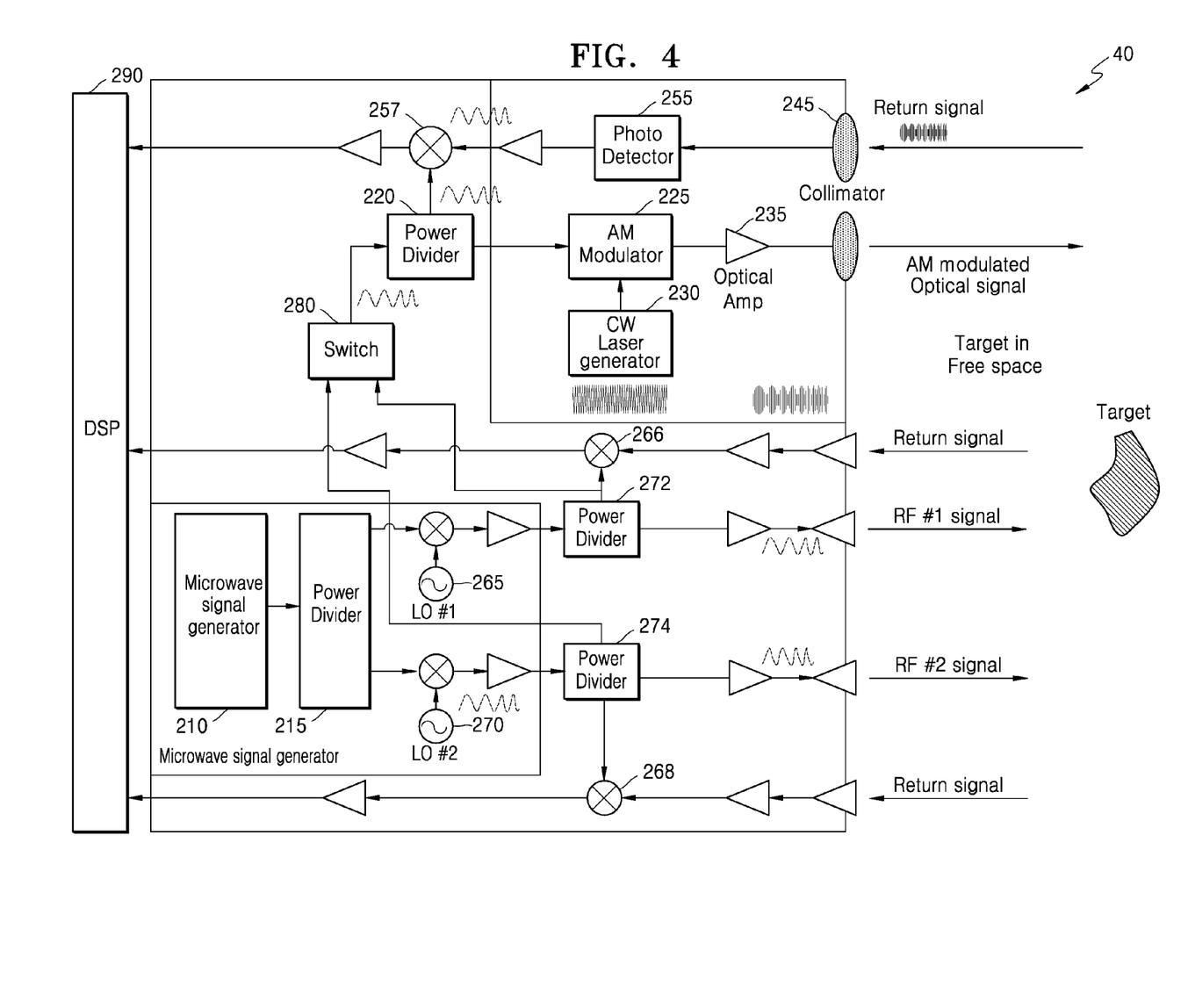
FIG. 4 shows another example of a target detecting apparatus according to some embodiments.

FIG. 4 shows another example of a target detecting apparatus 40 according to some embodiments.

Referring to FIG. 4, the target detecting apparatus 40 may further include mixers 266 and 268, power dividers 272 and 274, and a switch 280 in addition to the microwave signal generator 210, the power dividers 215 and 220, the intensity modulator 225, the continuous wave laser generator 230, the optical amplifier 235, the collimator 245, the photo detector 255, the mixer 257, the DSP 290, and the local oscillators 265 and 270.

The microwave signal generator 210, the power dividers 215 and 220, the intensity modulator 225, the continuous wave laser generator 230, the optical amplifier 235, the collimator 245, the photo detector 255, the mixer 257, the DSP 290, and the local oscillators 265 and 270 of FIG. 4 may perform the same operations as the components of FIG. 3. Accordingly, a detailed description of the corresponding components is omitted below.

The power divider 272 may transmit an FMCW signal corresponding to a first frequency band, the FMCW signal converted by the local oscillator 265, to an amplifier so that a third transmission signal of an FMCW radar may be generated. The power divider 274 may transmit an FMCW signal corresponding to a second frequency band, the FMCW signal converted by the local oscillator 270, to the amplifier so that a fourth transmission signal of the FMCW radar may be generated.

Also, when a third reception signal reflected from a target is received, the power divider 272 may transmit the FMCW signal corresponding to the first frequency band to the mixer 266 in order to obtain a third beat signal. When a fourth reception signal reflected from the target is received, the power divider 274 may transmit the FMCW signal corresponding to the second frequency band to the mixer 268 in order to obtain a fourth beat signal.

The power divider 272 may transmit the FMCW signal corresponding to the first frequency band to the switch 280, and the power divider 274 may transmit the FMCW signal corresponding to the second frequency band to the switch 280. The switch 280 may select a frequency band of an FMCW signal which is input to modulate intensity of a continuous wave laser generated by the continuous wave laser generator 230.

The FMCW radar included in the target detecting apparatus 40 may simultaneously transmit signals in various frequency bands and thus may detect a target in a very short time. Also, the target detecting apparatus 40 may select a laser signal in a frequency band suitable for any reflection characteristic of various targets by changing a frequency band of an FMCW signal which is input to modulate a transmission signal of an LFIM LiDAR.

Figure 5:
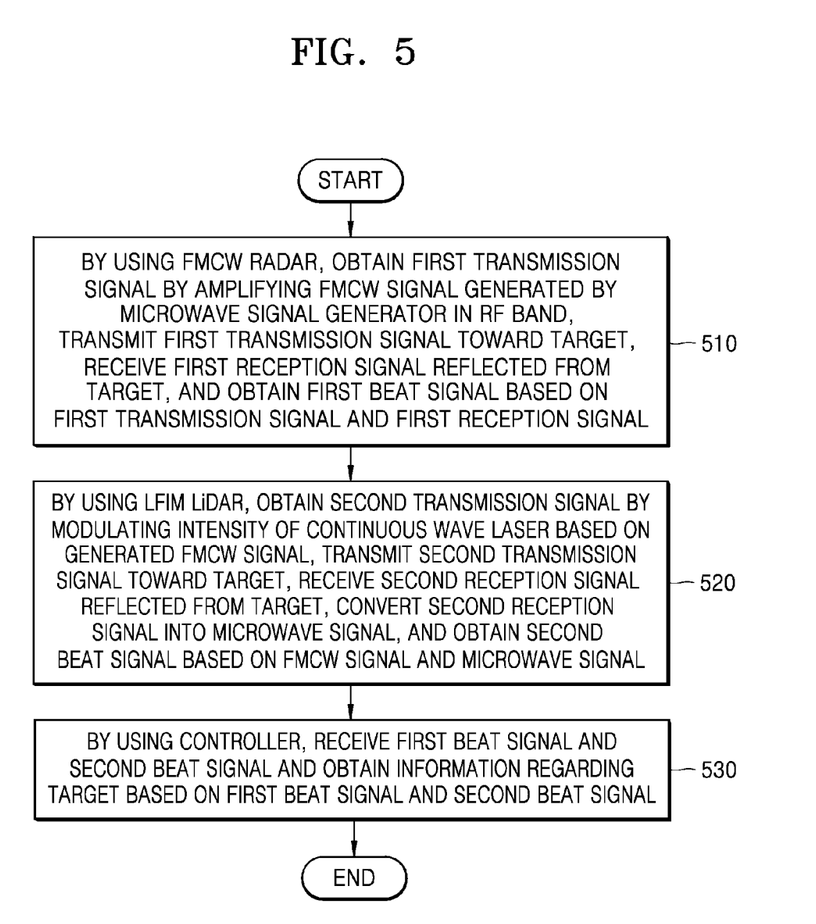
FIG. 5 is a flowchart of a method of detecting a target, according to some embodiments.

FIG. 5 is a flowchart of a method of detecting a target, according to some embodiments.

Referring to FIG. 5, a method by which a target detecting apparatus including an FMCW radar, an LFIM LiDAR, and a controller detects a target includes operations which are sequentially processed in the target detecting apparatus 10, 20, 30, and 40 shown in FIGS. 1 to 4. Accordingly, although omitted below, the above descriptions of the target detecting apparatus shown in FIGS. 1 to 4 may also be applied to the method of FIG. 5.

In operation 510, by using the FMCW radar, the target detecting apparatus may obtain a first transmission signal by amplifying an FMCW signal generated by a microwave signal generator in a RF band, may transmit the first transmission signal toward a target, may receive a first reception signal reflected from the target, and may obtain a first beat signal based on the first transmission signal and the first reception signal.

By using the FMCW radar, the target detecting apparatus may select one or more of FMCW signals corresponding to a plurality of frequency bands, and may obtain a first transmission signal by amplifying the selected one or more FMCW signals in the RF band.

By using the FMCW radar, the target detecting apparatus may obtain a first beat signal including distance information of the target or speed information of the target by mixing the first transmission signal and the first reception signal with each other.

In operation 520, by using the LFIM LiDAR, the target detecting apparatus may obtain a second transmission signal by modulating intensity of a continuous wave laser based on the generated FMCW signal, may transmit the second transmission signal toward the target, may receive a second reception signal reflected from the target, may convert the second reception signal into a microwave signal, and may obtain a second beat signal based on the FMCW signal and the microwave signal.

By using the LFIM LiDAR, the target detecting apparatus may select one of the FMCW signals corresponding to a plurality of frequency bands, and may obtain a second transmission signal by modulating continuous wave laser based on the selected FMCW signal.

By using the LFIM LiDAR, the target detecting apparatus may obtain a second beat signal including distance information of the target or speed information of the target by mixing the FMCW signal used to modulate continuous wave laser and the microwave signal resulting from conversion with each other.

In operation 530, by using the controller, the target detecting apparatus may receive the first beat signal and the second beat signal, and may obtain information regarding the target based on the first beat signal and the second beat signal. A frequency of the first beat signal may correspond to a difference between a frequency of the first transmission signal and a frequency of the first reception signal, and a frequency of the second beat signal may correspond to a difference between a frequency of the FMCW signal and a frequency of the microwave signal.

Also, the target detecting apparatus may obtain information regarding the target by using a reflection characteristic of the target resulting from a difference in center frequency between the first transmission signal and the second transmission signal. The target detecting apparatus may obtain first information of the target based on the first beat signal and obtain second information of the target based on the second beat signal, and may obtain information regarding the target by applying a weighting determined based on an SNR of the first beat signal and an SNR of the second beat signal to the first information and the second information.

Figure 6:
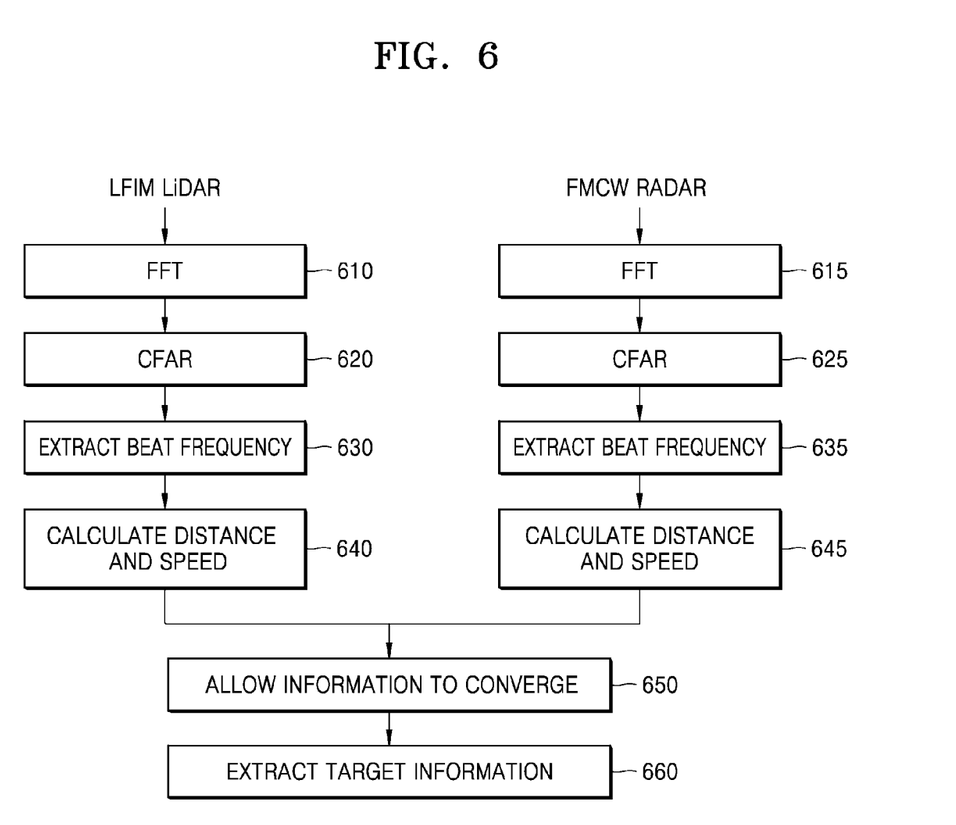
FIG. 6 is a flowchart of a method by which a target detecting apparatus extracts target information, according to some embodiments.

FIG. 6 is a flowchart of a method by which a target detecting apparatus extracts target information, according to some embodiments.

Referring to FIG. 6, operations 610, 620, 630, and 640 may be performed by an LFIM LiDAR included in the target detecting apparatus, and operations 615, 625, 635, and 645 may be performed by an FMCW radar included in the target detecting apparatus. However, this is merely an example, and in some embodiments, the operations 610 to 645 may be performed by a controller included in the target detecting apparatus.

In operation 610, the target detecting apparatus may perform fast Fourier transform (FFT) on a first reception signal received via the LFIM LiDAR. In operation 620, the target detecting apparatus may apply a constant false alarm rate (CFAR) algorithm to the first reception signal transformed by FFT.

In operation 630, the target detecting apparatus may extract a first beat frequency corresponding to the first reception signal. In operation 640, the target detecting apparatus may calculate a distance and speed of a target by analyzing the extracted first beat frequency.

In operation 615, the target detecting apparatus may perform FFT on a second reception signal received via the FMCW radar. In operation 625, the target detecting apparatus may apply a CFAR algorithm to the second reception signal transformed by FFT.

In operation 635, the target detecting apparatus may extract a second bit frequency corresponding to the second reception signal. In operation 645, the target detecting apparatus may calculate a distance and speed of the target by analyzing the extracted second beat frequency.

In operation 650, the target detecting apparatus may allow target information obtained via the LFIM LiDAR and target information obtained via the FMCW radar to converge. Accordingly, in operation 660, the target detecting apparatus may extract target information. For example, respective detecting capabilities of the FMCW radar and the LFIM LiDAR may be different from each other due to a reflection characteristic of the target or an influence of environment, and accordingly, the target detecting apparatus may obtain information regarding the target with high accuracy by setting a high weighting on information obtained by an apparatus from among the FMCW radar and the LFIM LiDAR having a better detecting capability in each situation.

The method for detecting a target, which is shown in FIG. 5, or the method by which a target detecting apparatus extracts target information, which is shown in FIG. 6, may be recorded on a computer-readable recording medium having recorded thereon one or more programs including commands for executing the method. Examples of the computer-readable recording medium include magnetic media (e.g., hard disc, floppy disc, or magnetic tape), optical media (e.g., CD-ROM or digital versatile disc (DVD)), magneto-optical media (e.g., floptical disc) and hardware devices that are specially configured to store and carry out a program command (e.g., ROM, RAM, or flash memory). Examples of the program command include a high-level language code that may be executed by a computer using an interpreter as well as a machine language code made by a complier.

While one or more embodiments have been described above in detail, it will be understood by those of ordinary skill in the art that various changes in form and details may be made therein without departing from the spirit and scope of the inventive concept as defined by the following claims.

What is claimed is:

1. An apparatus for detecting a target, the apparatus comprising:
   a microwave signal generator;
   a frequency modulation continuous wave (FMCW) radar configured to obtain a first transmission signal by amplifying an FMCW signal generated by the microwave signal generator in a radio frequency (RF) band, transmit the first transmission signal toward the target, receive a first reception signal reflected from the target, and obtain a first beat signal based on the first transmission signal and the first reception signal;
   a linear frequency intensity modulation (LFIM) light detection and ranging (LiDAR) device configured to obtain a second transmission signal by modulating intensity of a continuous wave laser based on the generated FMCW signal, transmit the second transmission signal toward the target, receive a second reception signal reflected from the target, convert the second reception signal into a microwave signal, and obtain a second beat signal based on the FMCW signal and the microwave signal; and
   a controller configured to receive the first beat signal and the second beat signal and obtain information regarding the target based on the first beat signal and the second beat signal.

2. The apparatus of claim 1, wherein the microwave signal generator comprises a local oscillator configured to convert the FMCW signal generated by the microwave signal generator into FMCW signals corresponding to a plurality of frequency bands.

3. The apparatus of claim 2, wherein the FMCW radar is further configured to select one or more FMCW signals from among the FMCW signals corresponding to the plurality of frequency bands, and obtain the first transmission signal by amplifying the selected one or more FMCW signals in the RF band.

4. The apparatus of claim 2, wherein the LFIM LiDAR device is further configured to select one of the FMCW signals corresponding to the plurality of frequency bands, and obtain the second transmission signal by modulating the intensity of the continuous wave laser based on the selected FMCW signal.

5. The apparatus of claim 1, wherein the LFIM LiDAR device comprises an intensity modulator configured to modulate the intensity of the continuous wave laser as the generated FMCW signal is input.

6. The apparatus of claim 5, wherein the LFIM LiDAR device is further configured to supply a direct-current (DC) offset based on an amplitude of the generated FMCW signal to the intensity modulator.

7. The apparatus of claim 1, wherein the information regarding the target comprises at least one of distance information of the target and speed information of the target.

8. The apparatus of claim 1, wherein the controller is further configured to obtain the information regarding the target by using a reflection characteristic of the target resulting from a difference in center frequency between the first transmission signal and the second transmission signal.

9. The apparatus of claim 1, wherein the controller is further configured to obtain first information of the target based on the first beat signal, obtain second information of the target based on the second beat signal, and obtain the information regarding the target by applying a weighting to the first information and the second information, wherein the weighting is determined based on a signal-to-noise ratio (SNR) of the first beat signal and an SNR of the second beat signal.

10. A method by which a target detecting apparatus comprising a frequency modulation continuous wave (FMCW) radar, a linear frequency intensity modulation (LFIM) light detection and ranging (LiDAR) device, and a controller detects a target, the method comprising:
   obtaining a first transmission signal by amplifying an FMCW signal generated by a microwave signal generator in a radio frequency (RF) band, transmitting the first transmission signal toward the target, receiving a first reception signal reflected from the target, and obtaining a first beat signal based on the first transmission signal and the first reception signal, wherein the obtaining, the transmitting, and the receiving are performed by using the FMCW radar;
   obtaining a second transmission signal by modulating intensity of a continuous wave laser based on the generated FMCW signal, transmitting the second transmission signal toward the target, receiving a second reception signal reflected from the target, converting the second reception signal into a microwave signal, and obtaining a second beat signal based on the FMCW signal and the microwave signal, wherein the obtaining, the transmitting, the receiving, and the converting are performed by using the LFIM LiDAR device; and receiving the first beat signal and the second beat signal and obtaining information regarding the target based on the first beat signal and the second beat signal, wherein the receiving and the obtaining are performed by using the controller.

11. A non-transitory computer-readable recording medium having recorded thereon one or more programs including commands for executing a method by which a target detecting apparatus comprising a frequency modulation continuous wave (FMCW) radar, a linear frequency intensity modulation (LFIM) light detection and ranging (LiDAR) device, and a controller detects a target, the method comprising:

obtaining a first transmission signal by amplifying an FMCW signal generated by a microwave signal generator in a radio frequency (RF) band, transmitting the first transmission signal toward the target, receiving a first reception signal reflected from the target, and obtaining a first beat signal based on the first transmission signal and the first reception signal, wherein the obtaining, the transmitting, and the receiving are performed by using the FMCW radar;

obtaining a second transmission signal by modulating intensity of a continuous wave laser based on the generated FMCW signal, transmitting the second transmission signal toward the target, receiving a second reception signal reflected from the target, converting the second reception signal into a microwave signal, and obtaining a second beat signal based on the FMCW signal and the microwave signal, wherein the obtaining, the transmitting, the receiving, and the converting are performed by using the LFIM LiDAR device; and receiving the first beat signal and the second beat signal and obtaining information regarding the target based on the first beat signal and the second beat signal, wherein the receiving and the obtaining are performed by using the controller.

* * * * *